United States Patent [19]

Takezawa et al.

[11] Patent Number: 4,516,746

[45] Date of Patent: May 14, 1985

[54] NUTATION DAMPER SYSTEM COMPRISING A CONTROL MEMBER FOR VARYING A NATURAL FREQUENCY OF A PENDULUM

[75] Inventors: Susumu Takezawa; Ken'ichi Ikebe; Haruki Ayada; Tatsuyuki Fukui; Munenori Okada, all of Tokyo, Japan

[73] Assignee: NEC Corporation, Japan

[21] Appl. No.: 482,970

[22] Filed: Apr. 8, 1983

[30] Foreign Application Priority Data

Apr. 9, 1982 [JP] Japan .................. 57-58322

[51] Int. Cl.³ ............................. B64G 1/38
[52] U.S. Cl. ................................. 244/170
[58] Field of Search ............ 244/164, 166, 170, 171; 188/267, 378; 74/5.5; 310/105

[56] References Cited

U.S. PATENT DOCUMENTS

| | | | |
|---|---|---|---|
| 2,996,267 | 8/1961 | Warren | 188/267 |
| 3,637,169 | 1/1972 | Tossman et al. | 244/170 |
| 3,806,062 | 4/1974 | Hofmann et al. | 244/170 |
| 3,830,447 | 8/1974 | Phillips | 244/170 |
| 4,168,048 | 9/1979 | Renner | 244/166 |

FOREIGN PATENT DOCUMENTS

| | | | |
|---|---|---|---|
| 2539740 | 3/1977 | Fed. Rep. of Germany | 244/170 |
| 2,040,513 | 8/1980 | United Kingdom | 244/170 |

Primary Examiner—Trygve M. Blix
Assistant Examiner—Rodney Corl
Attorney, Agent, or Firm—Ostrolenk, Faber, Gerb & Soffen

[57] ABSTRACT

In a nutation damper system which includes a pendulum (30, 33, 34, 38) swingable at a natural frequency and a block element (35) which cooperates with the pendulum to damp nutations having a nutation frequency, a control member (40) electromagnetically coupled to the pendulum is provided for varying the natural frequency to a forced frequency substantially equal to the nutation frequency. The control member comprises an electromagnetic coil energized by a control signal having electric current produced by a control signal circuit which is proportional to a square of the nutation frequency. The block element may comprise either a permanent magnet or an electromagnet when a pendulum weight of the pendulum is of an electrical conductor. The electromagnet may intermittently be energized by a power source circuit. Alternatively, the block element may be of an electrical conductor when the pendulum weight is of a permanent magnet.

8 Claims, 7 Drawing Figures

U.S. Patent May 14, 1985 Sheet 2 of 2 4,516,746

NUTATION DAMPER SYSTEM COMPRISING A CONTROL MEMBER FOR VARYING A NATURAL FREQUENCY OF A PENDULUM

BACKGROUND OF THE INVENTION

This invention relates to a nutation damper system for damping nutation in an artificial satellite.

An artificial satellite comprises a body and at least one antenna mounted on the body and is operable in a mission mode to carry out predetermined flight operations when launched in a space. During the flight operations, the satellite is intentionally or unintentionally rotated or spun like a top around an axis of rotation. It should be noted here that a spin rate and moment of inertia are variable because a mass of the satellite is variable in the mission mode due to consumption of fuel used in the satellite and because a despun motor or the like is operated. As a result, the rotation of the satellite is accompanied by nutation in addition to precession. The nutation is specified by a nutation frequency and a nutation amplitude.

A conventional nutation damper system is carried on the body of the satellite to damp the nutation by the use of an eddy current. More particularly, the conventional nutation damper system comprises a damper unit of a pendulous type comprising, in turn, a conductive plate fixed to the satellite body and a pendulous magnetic piece movable relative to the fixed conductive plate in response to the nutation to induce the eddy current in the fixed conductive plate. The pendulous magnetic piece is swingable at a natural frequency. In order to effectively damp the nutation, the natural frequency should be tuned to the nutation frequency. Otherwise, damping effect of the nutation is unduly reduced. Inasmuch as the nutation frequency is variable in dependency on the spin rate and the moment of inertia, as mentioned above, the damper unit must be constituted so that the nutation frequency determined at a specific one of the flight operations is tuned to the natural frequency of the pendulous magnetic piece. When such a determined nutation frequency is different from a practical nutation frequency, it is impossible to adjust the determined nutation frequency to the practical one. Moreover, another nutation damper unit is indispensable to damp the nutation occurring during another one of the flight operations. Therefore, the nutation damper system inevitably becomes heavy in weight and bulky or intricate in structure.

SUMMARY OF THE INVENTION

It is an object of this invention to provide a nutation damper system which is capable of automatically responding to a variation of nutation frequency and/or amplitude to damp the nutation even when a nutation frequency accompanying the nutation varies during flight operations.

It is another object of this invention to provide a nutation damper system of the type described, which is simple in structure and light in weight.

A nutation damper system to which this invention is applicable is for use in an artificial satellite having a body rotatable around an axis of rotation with nutation accompanying the rotation. The body is movable at acceleration having a variable component along the axis. The nutation has a nutation frequency dependent on a spin rate and moment of inertia. The nutation damper system comprises damping means comprising a pendulum for carrying out a swinging movement about a fulcrum at a natural frequency in response to the nutation. The damping means is for causing the pendulum to damp the nutation. According to this invention, the nutation damper system comprises acceleration component detecting means for detecting the component to produce an acceleration signal representative of the component, calculating means responsive to the acceleration signal for calculating the nutation frequency from the component to produce a nutation signal representative of the nutation frequency, control signal producing means responsive to the nutation signal for producing a control signal dependent on the nutation frequency, and control means coupled to the pendulum and responsive to the control signal for controlling the swinging movement to vary the natural frequency to a forced frequency which is substantially equal to the nutation frequency.

DESCRIPTION OF THE PREFERRED EMBODIMENTS

Figure 1:
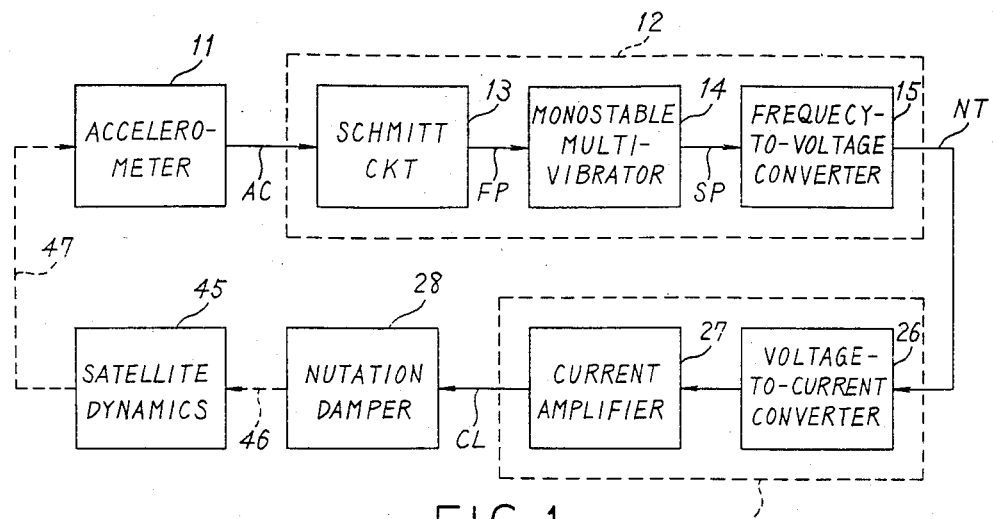
FIG. 1 shows a block diagram of a nutation damper system according to a first embodiment of this invention.

Referring to FIG. 1, a nutation damper system according to a first embodiment of this invention is shown for use in an artificial satellite (not shown) to control nutation of the satellite. The satellite has a body (not shown in FIG. 1) rotatable around an axis of rotation. The body has a center of gravity and is movable relative to the center of gravity at acceleration having a variable component along the axis. Such a variable component may be called a variable acceleration hereinafter. The rotation is accompanied by nutation resulting from attitude control thrusting jet, terrestrial magnetization and the like. The nutation has a nutation frequency dependent on a spin rate and moment of inertia.

In FIG. 1, the nutation damper system comprises an accelerometer 11 for detecting the variable acceleration to produce an acceleration signal AC representative of the variable acceleration. The accelerometer 11 may be of a force rebalance type which is known in the art and which provides as the acceleration signal a sinusoidal signal. Such a sinusoidal signal has a frequency equal to the nutation frequency and an amplitude proportional to a nutation angle.

Supplied with the acceleration signal AC, a nutation frequency calculating circuit 12 calculates the nutation frequency from the variable acceleration to produce a nutation signal NT. More particularly, the nutation frequency calculating circuit 12 comprises a Schmitt circuit 13 for converting the acceleration signal AC into a sequence of first pulses FP each of which has a variable pulse width. A monostable multivibrator 14 serves for shaping the first pulse sequence into a sequence of second pulses SP each of which is of the same pulse width. The second pulse sequence SP has a repetition frequency equal to the nutation frequency. The second pulse sequence SP is supplied to a frequency-to-voltage converter 15 to be converted into the nutation signal NT. The nutation signal NT has a voltage level or an amplitude proportional to the nutation frequency.

Figure 2:
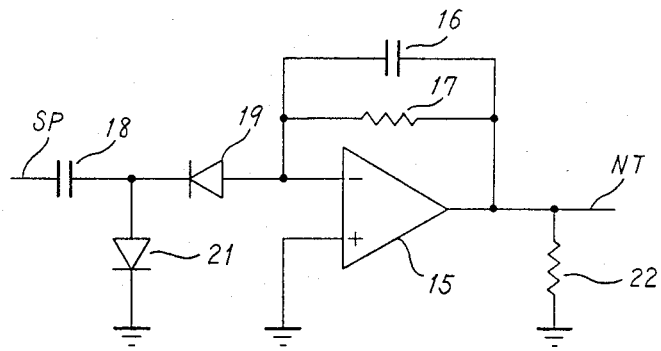
FIG. 2 shows a circuit diagram of a frequency-to-voltage converter illustrated in FIG. 1.

Referring to FIG. 2, the frequency-to-voltage converter 15 comprises an operational amplifier 15 having a positive input terminal kept at a predetermined potential as depicted at a symbol of "ground," a negative input terminal, and an output terminal. A parallel circuit of a first capacitor 16 and a first resistor 17 is connected between the output terminal and the negative input terminal. A series circuit of a second capacitor 18 and a first diode 19 is connected to the negative input terminal. A second diode 21 is connected between the predetermined potential and a point of connection between the second capacitor 18 and the first diode 19 while a second resistor 22 is connected between the predetermined potential and the output terminal.

The second pulse sequence SP is supplied to the negative input terminal of the operational amplifier 15 through the second capacitor 18 and the first diode 19 to charge the first capacitor 16. With this structure, the voltage level of the nutation signal NT becomes high with an increase of the repetition frequency of the second pulse sequence SP because of presence of the first and the second diodes 19 and 21 both of which are operable to make the first capacitor 16 discharge.

Referring back to FIG. 1, the nutation damper system comprises a control signal circuit 25 operable in response to the nutation signal NT. The control signal circuit 25 comprises a voltage-to-current converter 26 for converting the voltage level of the nutation signal NT into a current signal which has a current level corresponding to the voltage level of the nutation signal NT.

Supplied with the current signal, a current amplifier 27 amplifies the current signal to produce an amplified current signal defined by a factor J proportional to a square of the nutation frequency. More specifically, the factor J is given by:

$$J = c_1 \lambda^2, \tag{1}$$

where $c_1$ is a constant and $\lambda$ is the nutation frequency. Such a factor J can be realized by selecting a current gain in the current amplifier 27. The amplified current signal may be called a factor signal. In any event, a combination of the voltage-to-current converter 26 and the current amplifier 27 is operable as the control circuit 25 for processing the nutation signal NT in accordance with the factor and to produce the factor signal. The factor signal is supplied as a control signal CL from the current amplifier 27 to a nutation damper 28 through a connection between the current amplifier 27 and the nutation damper 28, as illustrated in FIG. 1.

Figure 3:
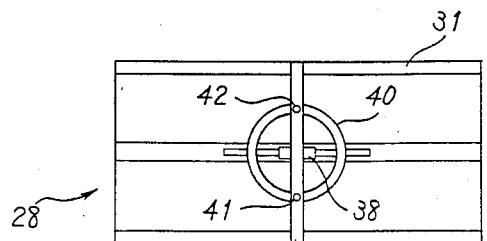
FIG. 3 shows a top view of a nutation damper for use in the nutation damper system illustrated in FIG. 1.
Figure 4:
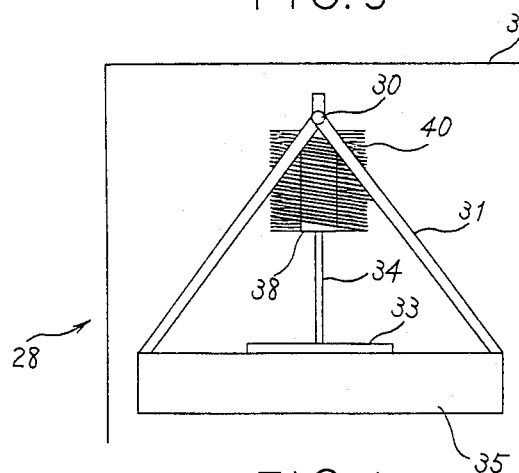
FIG. 4 shows a front view of the nutation damper illustrated in FIG. 3.
Figure 5:
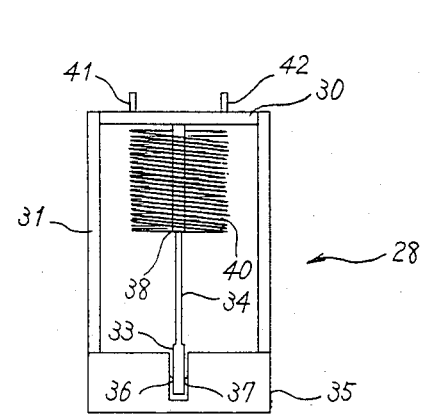
FIG. 5 shows a side view of the nutation damper illustrated in FIG. 3.

Referring to FIG. 1 again and FIGS. 3, 4, and 5 afresh, the nutation damper 28 is for use in damping the nutation having the nutation frequency and comprises a pendulum for carrying out a swinging movement about a fulcrum bar 30 at a natural frequency. The fulcrum bar 30 is extended along a predetermined direction. The fulcrum bar 30 is supported by four support rods 31 to serve as a fulcrum. Each support rod is made of aluminum. The pendulum is swingable in a first direction orthogonal to the predetermined direction. In other words, the pendulum is swingable leftwards and rightwards in each of FIGS. 3 and 4. The pendulum must in the meantime respond to the nutation which takes place in a direction orthogonal to that of the variable acceleration. Under the circumstances, the pendulum is placed on the satellite so that the first direction coincides with the direction of the nutation and that the fulcrum bar 30 is fixed to the satellite body symbolically depicted at 32.

The pendulum comprises a pendulum weight 33 formed by an electrically conductive plate and an arm 34 fixed to the pendulum weight 33 and supported to the fulcrum bar 30.

The pendulum weight 33 cooperates with a block element 35 in a manner to be later described more in detail. The illustrated block element 35 is of a permanent magnet having first and second inside surfaces 36 and 37 as best shown in FIG. 5 along the first direction to define a channel between the first and the second inside surfaces 36 and 37. The block element 35 is fixed to the body 32 so that the permanent magnet has an axis of magnetization in a second direction transverse to the first direction. Thus, a magnetic field is generated in the second direction at least in the channel between the first and second inside surfaces 36 and 37 and the pendulum weight 33 is swingable in the channel with the magnetic field intersected by the pendulum weight 33.

When the pendulum weight 33 swings in the channel relative to the block element 35, an eddy current is induced in the pendulum weight 33 by virtue of presence of the magnetic field so as to suppress the swinging movement of the pendulum weight 33. As a result, the nutation is damped by a combination of the pendulum and the block element 35. Accordingly, the combination of the pendulum and the block element 35 may be called a damping unit for damping the nutation.

It should be noted here that the nutation can effectively be damped or attenuated when the nutation frequency is tuned to the natural frequency of the damping unit. However, the natural frequency f can not be changed by such a damping unit alone. Accordingly, it is difficult to cope with a variation of the nutation frequency only by the use of the damping unit.

The illustrated pendulum further comprises a rod shaped permanent magnet 38 adjacent to the fulcrum bar 30. Let the rod shaped permanent magnet 38 have an intensity M of 10 AT·m², a length of 10 cm, and a weight of 0.2 Kg. Herein, it is assumed that the pendulum has a moment of inertia equal to $8 \times 10^{-3}$ Kg·m².

The rod shaped permanent magnet 38 is surrounded by an electromagnetic coil 40 having a coil input terminal 41 and a coil output terminal 42 both of which are fixed to the fulcrum bar 30. The control signal CL which has the current level specified by the factor J is caused to flow from the coil input terminal 41 through the electromagnetic coil 40 to the coil output terminal 42. As a result, the electromagnetic coil 40 generates an electromagnetic field determined by the control signal CL. The electromagnetic field is specified by a magnetic flux density. Let the electromagnetic coil 40 have a length of 10 cm and the number of turns equal to 100 turns.

When the nutation angle is comparatively small, it is known that the natural frequency f of the pendulum is given by:

$$f^2 = MG_0/I, \quad (2)$$

where M is representative of the intensity of the rod shaped permanent magnet; $B_0$, the magnetic flux density resulting from the electromagnetic coil 40; and I, the moment of inertia in the pendulum.

On the other hand, it is well known that the magnetic flux density $B_0$ is proportional to a current which flows through the electromagnetic coil 40. Inasmuch as the current is specified by the control signal CL and is equal to the factor J given by Equation (1) in the illustrated damper, the magnetic flux density $B_0$ is represented by:

$$B_0 = c_2 J, \quad (3)$$

where $c_2$ represents a constant.

Substitution of Equation (3) into Equation (2) gives:

$$f^2 = Mc_2 J/I. \quad (4)$$

Further substitution of Equation (1) into Equation (4) gives:

$$f^2 = Mc_2 \cdot c_1 \lambda^2 / I. \quad (5)$$

When the constant $c_2$ is represented by:

$$c_2 = I/c_1 M, \quad (6)$$

Equation (5) is rewritten into:

$$f^2 = \lambda^2. \quad (7)$$

According to Equation (7), it is understood that the natural frequency f of the pendulum can be tuned to the nutation frequency $\lambda$, by selecting the factor J and the constant $c_2$. Thus, the natural frequency f is varied into a forced frequency which is substantially equal to the nutation frequency $\lambda$. It is readily possible to select the constant $c_2$ which satisfies Equation (6). For example, such selection of the constant $c_2$ is accomplished by adjusting the moment M of inertia and the intensity M of the rod shaped permanent magnet 38.

By way of example, the electromagnetic coil 40 was supplied as the control signal CL with the electric current between 1.63 A and 2.30 A. The magnetic flux density $B_0$ was between $2.048 \times 10^{-3}$ and $2.888 \times 10^{-3}$ (Web/m$^2$). The nutation frequency between 1.6 and 1.9 (rad/sec) could be damped by the use of the above-mentioned electromagnetic coil 40.

As mentioned before, the electromagnetic coil 40 produces the electromagnetic field to make the rod shaped permanent magnet 38 interact with the electromagnetic field and thereby to vary the natural frequency f to the forced frequency. In other words, the electromagnetic coil 40 serves to control the natural frequency f and may therefore be called a control member electromagnetically coupled to the pendulum for controlling the swinging movement of the pendulum.

Turning back to FIG. 1, the nutation damper 28 illustrated with reference to FIGS. 3, 4, and 5 is attached to the body 32 (FIG. 4) of the satellite at the block element 35. Satellite dynamics 45 are suppressed in a movement by the nutation damper 28, as symbolized by a broken line 46. The accelerometer 11 follows the satellite dynamics 45, as symbolized by another broken line 47, and produces the acceleration signal AC regulated by the nutation damper 28.

With the nutation damper system, it is possible to make the natural frequency f coincide with the nutation frequency $\lambda$. The nutation is therefore effectively eliminated even when the nutation frequency $\lambda$ is variable during various kinds of flight patterns.

Figure 6:
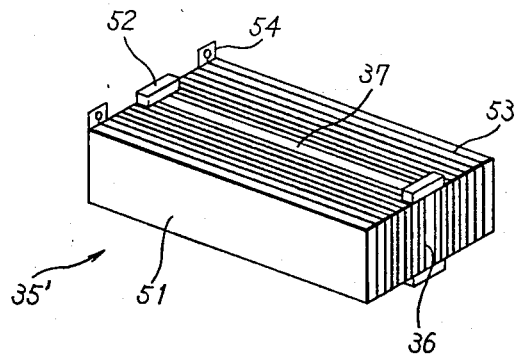
FIG. 6 shows a perspective view of a block element for use in a nutation damper according to a second embodiment of this invention.

Referring to FIG. 6, a block element 35' which may be substituted for that described in conjunction with FIGS. 3 through 5 is shown for use in a nutation damper system according to a second embodiment of this invention. The block element 35' serves as an electromagnetic and comprises a yoke 51 having the first and the second inside surfaces 36 and 37 to define the channel. The illustrated yoke 51 comprises two partial yokes and four joint elements 52 attached to the partial yokes to join the partial yokes to each other with the channel defined therebetween. Each of the partial yokes 51 may be of iron, aluminum, or a tetrafluoroethylene polymer known as Teflon while the joint elements may be of an insulator, such as Teflon.

The block element 35' comprises a control coil 53 which is wound around the partial yokes and which has both ends connected to a pair of source terminals 54 to be coupled to an electric power circuit as will later be described. In this structure, it is possible to generate the magnetic field in the second direction with an electric power circuit, as shown in the block element 35 illustrated with reference to FIGS. 3 through 5.

Figure 7:
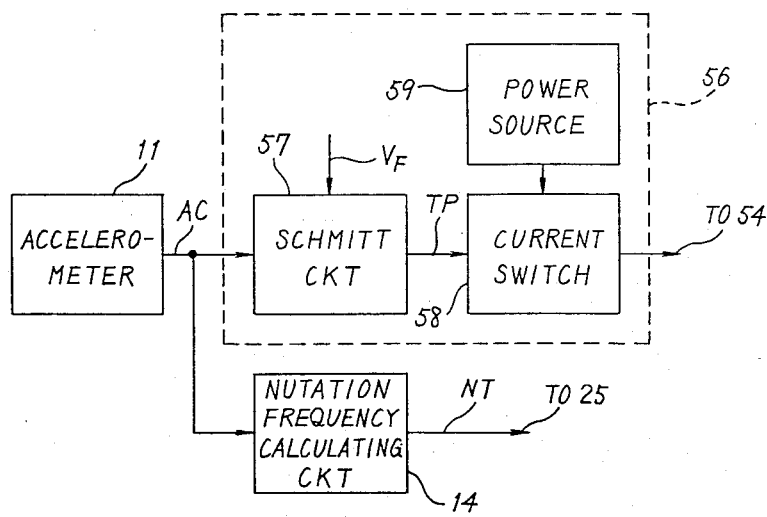
FIG. 7 shows a block diagram of a power source circuit for use in combination with the block element illustrated in FIG. 6.

Referring to FIG. 7 together with FIG. 6, the power source circuit depicted at 56 is for use in combination with the accelerometer 11 illustrated in FIG. 1 and is supplied with the acceleration signal AC having an amplitude proportional to a nutation angle, as mentioned before in conjunction with the accelerometer 11. For a better understanding, the nutation frequency calculating circuit 14 is also shown in FIG. 7. The power source circuit 56 comprises a Schmitt circuit 57 having a predetermined threshold level $V_R$. The Schmitt circuit 57 produces a sequence of third pulses TP only when the acceleration signal AC has an amplitude higher than the threshold level $V_R$. From this fact, it is readily understood that the threshold level $V_R$ is determined in consideration of a nutation angle to be damped by the nutation damper system. The nutation angle to be damped may be, for example, 0.01°. The Schmitt circuit 57 is operable to detect the nutation specified by the threshold level $V_R$.

Responsive to the third pulse sequence TP, a current switch 58 is turned on to allow an electric current to flow from a power source 59 to the source terminals 54 only during presence of each third pulse TP.

Inasmuch as the electric current is intermittently supplied from the power source 59 to the control coil 53, it is possible with the power source circuit 56 to reduce power consumed by the nutation damper 28. In a practical example, the electric current was sent to the nutation damper 28 a duration of several tens of seconds on detection of the nutation.

While this invention has thus far been described in conjunction with a few embodiments thereof, it will readily be possible for those skilled in the art to put this invention into practice in various other manners. For example, the block element 35' illustrated in FIG. 6 may be supplied with an electric current without any interruption. In FIGS. 3 through 5, the conductive plate may be of a magnetic material. The pendulum weight 33 may be a permanent magnet while the block element 35 illustrated with reference to FIGS. 3 through 5 may be of an electrical conductor. Such an electrical conductor may include a magnetic material. At any rate, the eddy current is induced in at least one of the pendulum weight and the block element 35 or 35'. This invention is applicable to a three-axis stabilized satellite rotatable around three axis.

What is claimed is:

1. An improved nutation damper system for use in an artificial satellite having a body which may be subject to a rotation accompanied by a nutation around an axis of rotation, said body being subjected to a variable acceleration force having a component along said axis, said nutation having a nutation frequency which is dependent on a spin rate and a moment of inertia associated with said satellite, said nutation damper system being of the type which include a damping mechanism incorporating a pendulum which swings about a fulcrum at a natural frequency in response to said nutation, said damping mechanism acting through said pendulum to dampen said nutation, the improvement wherein said system further comprises:

acceleration component detecting means for detecting said component and for producing an acceleration signal representative of said component;

calculating means responsive to said acceleration signal for calculating said nutation frequency from said component to produce a nutation signal representative of said nutation frequency;

control signal producing means responsive to said nutation signal for producing a control signal dependent on said nutation frequency; and control means coupled to said pendulum and responsive to said control signal for controlling said swinging movement to vary said natural frequency to a forced frequency which is substantially equal to said nutation frequency.

2. A nutation damper system as claimed in claim 1, wherein said control signal producing means comprises means for processing said nutation signal in accordance with a factor proportional to a square of said nutation frequency to produce a factor signal representative of said factor and means for producing said factor signal as said control signal.

3. A nutation damper system as claimed in claim 1, said pendulum comprising a pendulum weight and an arm fixed to said pendulum weight and supported at said fulcrum and said arm including:

a rod shaped permanent magnet adjacent to said fulcrum;

said control means comprising an electromagnetic coil surrounding said rod shaped permanent magnet and being responsive to said control signal for generating an electromagnetic field determined by said control signal, said rod shaped permanent magnet interacting with said electromagnetic field and thereby altering said natural frequency to said forced frequency.

4. A nutation damper system as claimed in claim 3, wherein said damping means comprises an element having a first and a second inside surface along a first direction which extends relative to but does not coincide with said acceleration component, said first and second surfaces defining a channel therebetween, said element being fixed to said body of said satellite while said pendulum weight is swingable in said channel along said first direction, such that said swinging produces an eddy current which is operative for reducing said nutation of said body.

5. A nutation damper system as claimed in claim 4, wherein said pendulum weight comprises a permanent magnetic piece for generating said magnetic field in a second direction transverse to said first direction, and said element comprises an electrically conductive material in which said channel between said first and said second inside surfaces is defined.

6. A nutation damper system as claimed in claim 4, wherein said pendulum weight comprises an electrically conductive plate and said element comprises magnetic field generating means for generating a magnetic field which encompasses at least said channel along a second direction extending transverse to said first direction.

7. A nutation damper system as claimed in claim 6, wherein said element comprises a permanent magnet having said first and said second inside surfaces and an axis of magnetization in said second direction, said magnetic field generating means comprising said permanent magnet.

8. A nutation damper system as claimed in claim 6, wherein said element includes a yoke having said first and said second inside surfaces, and wherein said magnetic field generating means comprises a coil wound around said yoke for producing said magnetic field.

* * * * *